US011427042B2

(12) United States Patent
Pedersoli

(10) Patent No.: US 11,427,042 B2
(45) Date of Patent: Aug. 30, 2022

(54) RATTLE-REDUCING VEHICULAR HITCH PIN ASSEMBLY

(71) Applicant: Maher Pedersoli, Tucson, AZ (US)

(72) Inventor: Maher Pedersoli, Tucson, AZ (US)

( * ) Notice: Subject to any disclaimer, the term of this patent is extended or adjusted under 35 U.S.C. 154(b) by 146 days.

(21) Appl. No.: 16/865,771

(22) Filed: May 4, 2020

(65) Prior Publication Data

US 2020/0346503 A1 Nov. 5, 2020

Related U.S. Application Data

(60) Provisional application No. 62/843,398, filed on May 4, 2019.

(51) Int. Cl.
*B60D 1/24* (2006.01)
*B60D 1/06* (2006.01)
*B60D 1/36* (2006.01)

(52) U.S. Cl.
CPC ............. *B60D 1/241* (2013.01); *B60D 1/065* (2013.01); *B60D 1/363* (2013.01)

(58) Field of Classification Search
CPC ........ B60D 1/241; B60D 1/065; B60D 1/363; B60D 1/06
USPC ....................................................... 280/506
See application file for complete search history.

(56) References Cited

U.S. PATENT DOCUMENTS

| | | | |
|---|---|---|---|
| 6,609,725 B1 | 8/2003 | Williams | |
| 6,672,115 B2 | 1/2004 | Wyers | |
| 6,688,804 B1 * | 2/2004 | Parent | B60D 1/075 280/506 |
| 7,004,701 B2 * | 2/2006 | Ross | B25B 13/485 411/405 |
| 7,338,065 B1 * | 3/2008 | Clausen | B60D 1/241 280/505 |
| 2014/0327228 A1 * | 11/2014 | Laurer | B60D 1/241 280/506 |
| 2015/0076793 A1 * | 3/2015 | Belinky | B60D 1/241 280/506 |
| 2015/0343866 A1 * | 12/2015 | Williams | B60D 1/52 29/525.04 |
| 2018/0215216 A1 * | 8/2018 | Faust | B60D 1/60 |
| 2019/0077205 A1 * | 3/2019 | Pare | B60D 1/60 |

OTHER PUBLICATIONS

Bryce Fastener, World's Most Secure Fasteners, Wayback Machine Date Mar. 11, 2019 (Year: 2019).*
GT40, Hollow Bolts, Jan. 23, 2015 (Year: 2015).*

* cited by examiner

*Primary Examiner* — Jacob D Knutson
*Assistant Examiner* — Abigail R Hymel
(74) *Attorney, Agent, or Firm* — Kang S. Lim

(57) ABSTRACT

An improved anti rattle hitch pin assembly for a trailer hitch assembly enables a threaded member to be inserted into the shank receiver, and allows for an easy alignment of a threaded device to the side hole of the shank receiver. The anti-rattle hitch pin assembly includes an arc-shaped retainer wire, a threaded receiver pin, a threaded member, and an optionally lockable member. The threaded member can be easily moved to the alignment position once the internal components of the hitch pin assembly including the retainer wire has been inserted inside the shank receiver tube.

13 Claims, 18 Drawing Sheets

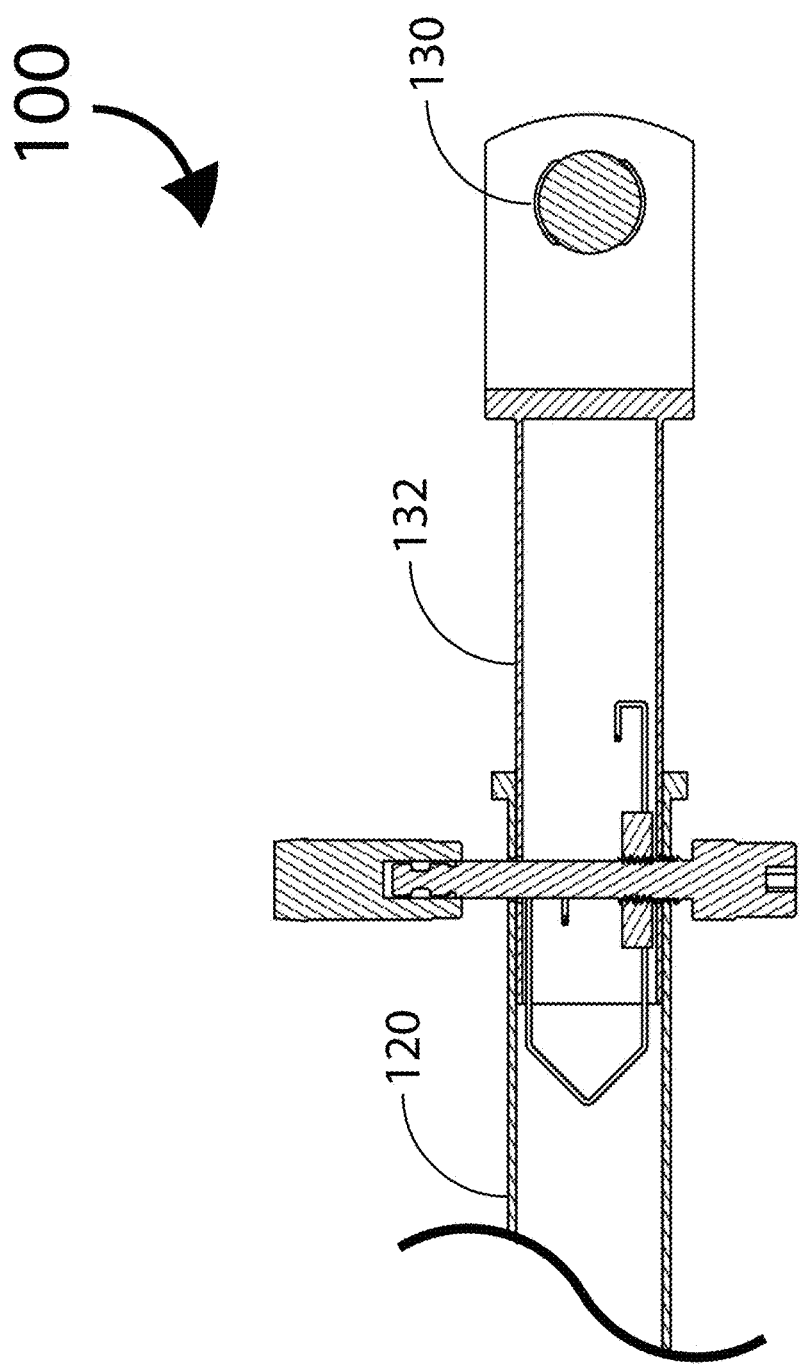

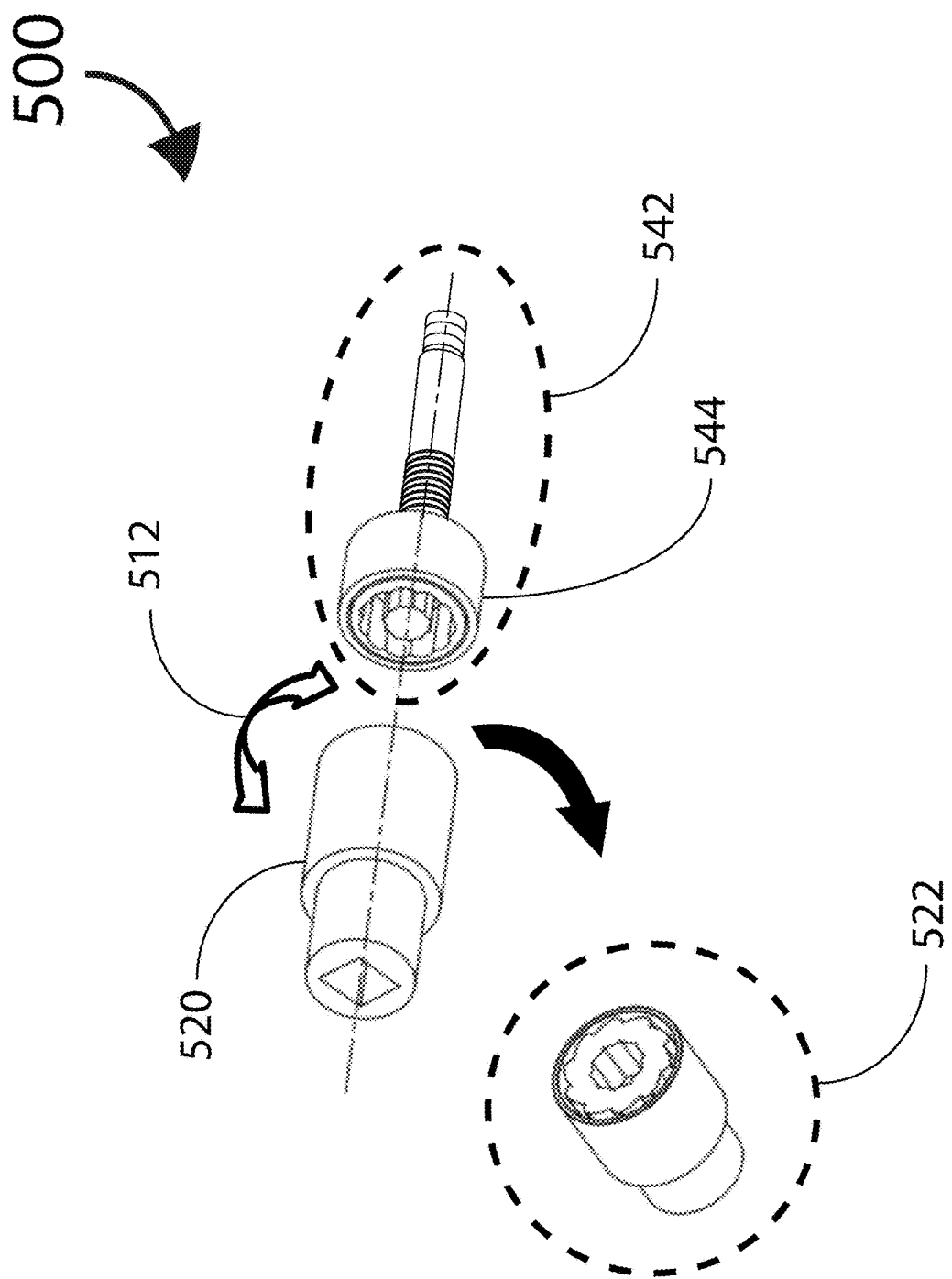

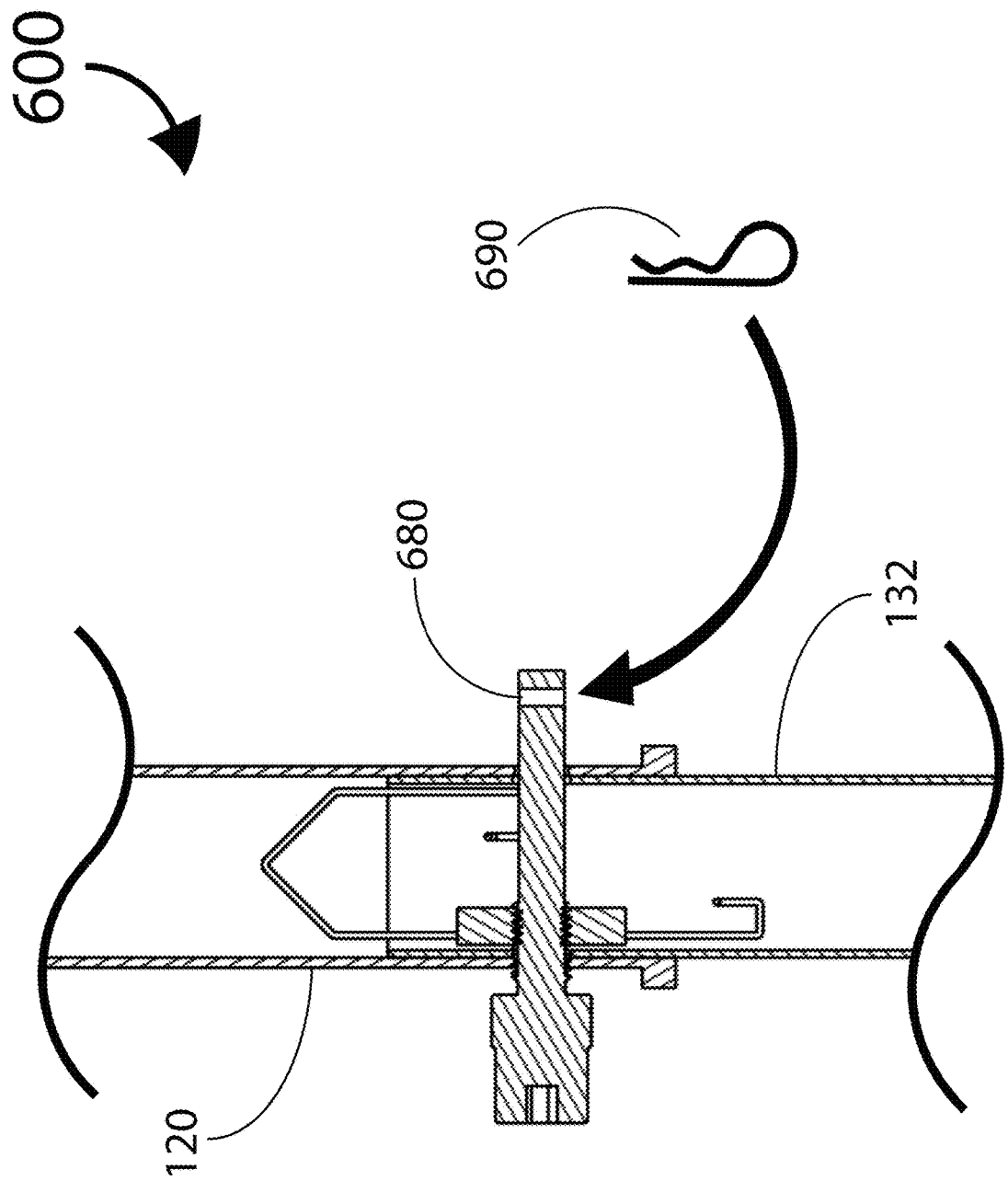

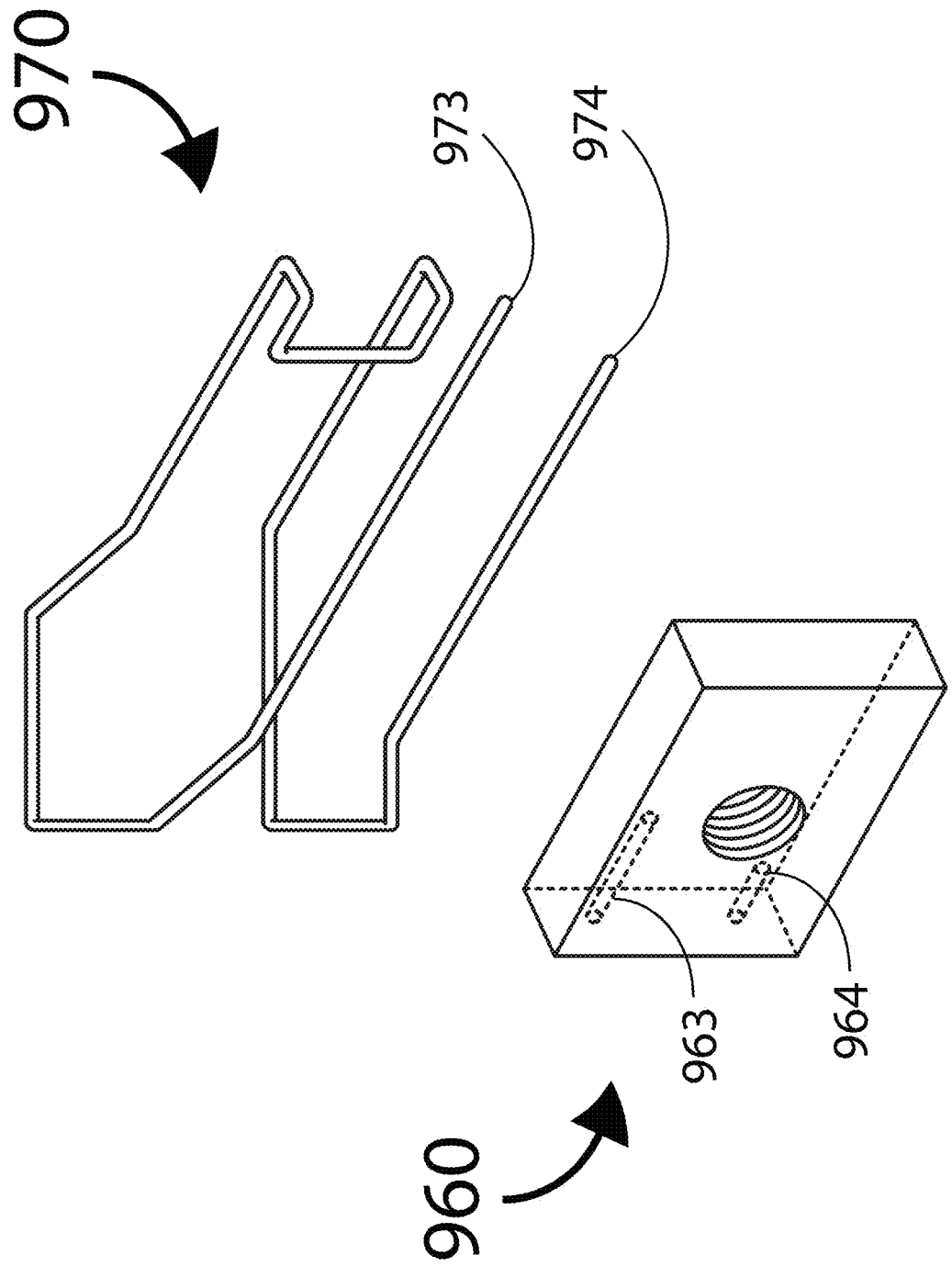

RATTLE-REDUCING VEHICULAR HITCH PIN ASSEMBLY

CROSS REFERENCE TO RELATED APPLICATION

This application claims priority of U.S. Provisional Application Ser. No. 62/843,398 filed on May 4, 2019, entitled "Dual Sided Anti Rattle Anti-Theft Trailer Hitch Receiver Locking Mechanism", which is hereby fully incorporated by reference.

BACKGROUND

The present invention relates to systems and methods for reducing rattle and wear in vehicular trailer hitch assemblies.

Many vehicles today are equipped with receiver-type trailer hitches. These types of trailer hitches typically include a square tube, normally 1½ or 2 inches internal height and width, attached to the undercarriage of the vehicle. A second tube acts as a shank and includes outer dimensions slightly smaller than the internal dimensions of the receiver tube is slidable within the receiver tube. The shank member comes in many different options and configurations. The shank member can be long or short in length.

Optional configurations for the shank member is have one hole on each side, or multiple holes on each side. The shank member may have two opposing side holes in the shank member sides, or multiple opposing side holes in the shank member sides. The shank member is connected to the receiver tube by a pin inserted through the two tubes and locked or clipped to prevent relative movement between the two tubes.

Hence, there presently is a need for a device that will minimize the rattle between the receiver tube and the shank member. There is a further need for a device that can be used with most of the existing receiver systems presently in use. There is a further need for a device that can fit various configurations of shank member such as longer, shorter, with two opposing side holes in the receiver tube, or with multiple opposing side holes in the receiver tube. Longer and halo shank member can very difficult to insert devices inside them to minimize the rattle, others with multiple opposing side holes in the receiver tube need a better way for a device to align itself in order to provide the optimal anti-rattle functionality and ease of use.

There have been a number of inferior attempts to solve this problem in the past. These attempts require the use of specially designed receivers, shanks, or accessories in order to reduce the rattle between the receiver and shank. Others that are not practical to construct and/or to use.

These prior devices either require specially designed receivers and shanks, use extraneous mounting devices to minimize the rattle between the receiver and the shank, or not suitable for shank member with different options and configurations such as shank members with multiple opposing side holes. Others have long shank members with hollow tubes or shank members with curved four sides, or simply didn't provide the anti-theft and the security needed for their end users.

For example, U.S. Pat. No. 6,672,115 discloses a locking device for a trailer hitch. The disadvantage of this device is it doesn't prevent the trailer hitch from rattling when the vehicle it's attached to is in motion. This causes audible noise issues and can negatively affect the performance of the vehicle the trailer hitch is attached to.

Another U.S. Pat. No. 6,609,725 discloses a single lateral spring for pressing a threaded member against an internal wall of the shank member. This arrangement is not very stable and also more difficult to adjust especially when the mounting holes are located deep inside the shank member.

Yet another U.S. Pat. No. 6,688,804 discloses a pair of nuts welded to and held together by a wire clip which provides substantial opposing lateral pressure on the inner walls of the shank member. Unfortunately, such an arrangement can adversely affect the required parallelism of the nuts due to variances in the internal dimensions of the shank member, and cause disastrous cross-threading during assembly.

It is therefore apparent that an urgent need exists for an improved anti-rattle hitch pin assembly that overcomes the deficiencies of the prior art solutions. The improved pin assemblies described in detail below provide a convenient, quick, flexible and novel solution for substantially reducing rattle and wear/tear on trailer hitch assemblies thereby increasing the life span and operational safety of these trailer hitch assemblies.

SUMMARY

To achieve the foregoing and in accordance with the present invention, systems and methods for reducing rattle and wear in vehicular trailer hitch assemblies is provided.

In one embodiment, an anti-rattle hitch pin assembly, useful with a trailer hitch assembly, includes a cylindrical long pin with a drive head housing, a threaded section and a securable end. The hitch pin assembly also includes an arc-shaped retainer configured to be secured inside a shank member of the trailer hitch assembly by exerting an outward vertical force against a top internal wall and a bottom internal wall of the shank member. The pin assembly also includes a movable slider block having a pair of opposing channels for housing an upper track section and a lower track section of the retainer. The slider block includes a threaded hole for mating with a threaded section of the long pin.

The long pin and the slider block are configured to securely compress a side wall of the receiver tube against an adjacent side wall of the shank member by engaging and tightening the threaded section of the long pin with the threaded hole of the slider block, thereby reducing rattle and wear between the receiver tube and the shank member.

In some embodiments, the drive head housing includes a custom security drive head and further includes a spinning guard ring that can freely rotate in both directions around the head housing to enhance security of the trailer hitch assembly.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 2 is a cross-sectional top view illustrating the anti-rattle vehicular trailer hitch assembly of FIG. 1A;

FIG. 5 depicts an additional exemplary embodiment with an alternate configuration for the long pin head housing of FIG. 3;

FIG. 6 is a cross-sectional top view illustrating another embodiment of the anti-rattle vehicular trailer hitch assembly of FIG. 1A;

FIGS. 8 & 9 are perspective views of two alternate embodiments of retainer wires for the hitch pin assembly of FIG. 3;

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

Figure 1A:
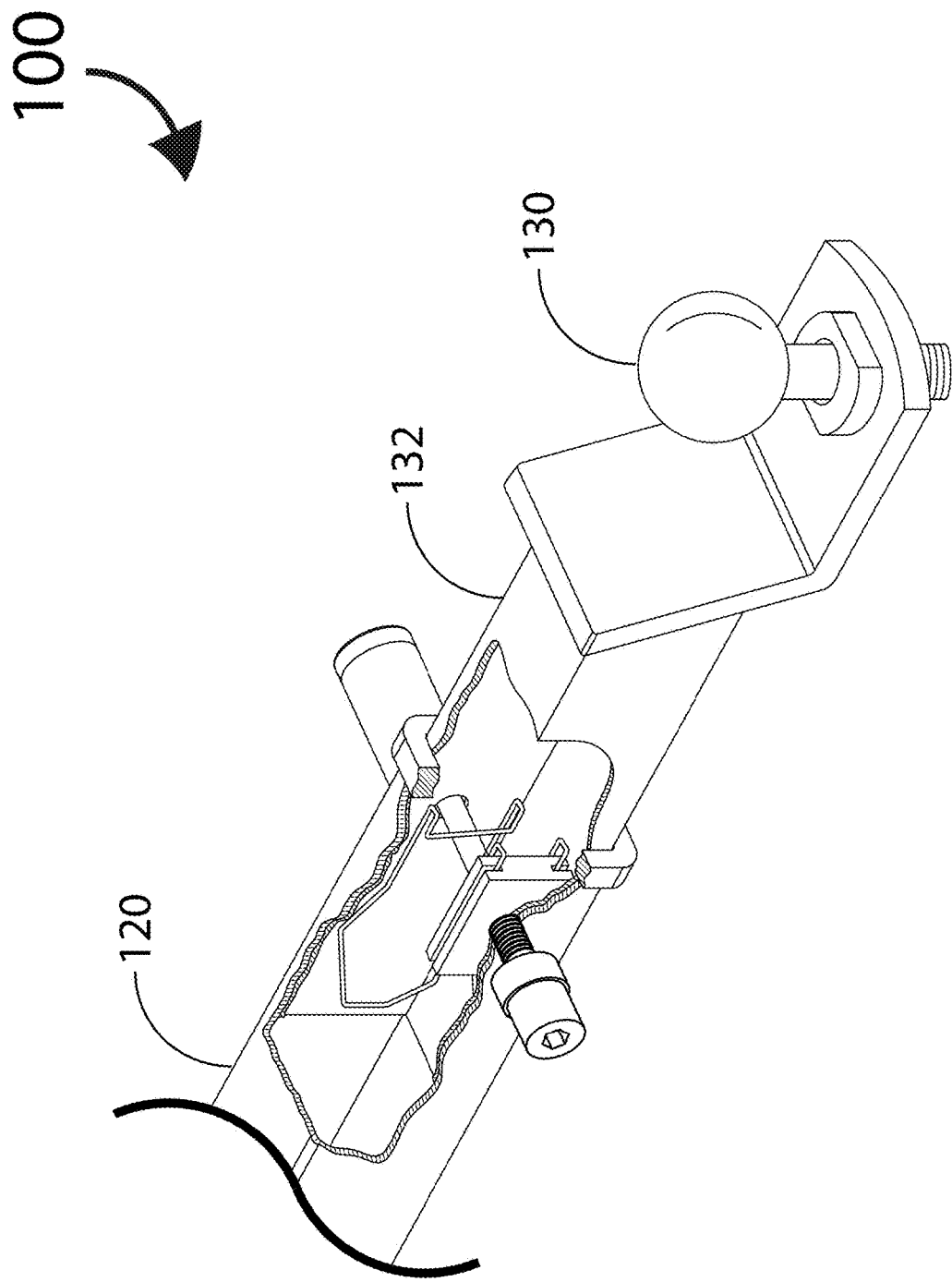
FIGS. 1A and 1B are perspective views illustrating an exemplary anti-rattle vehicular trailer hitch assembly, in accordance with one embodiment of the present invention.
Figure 1B:
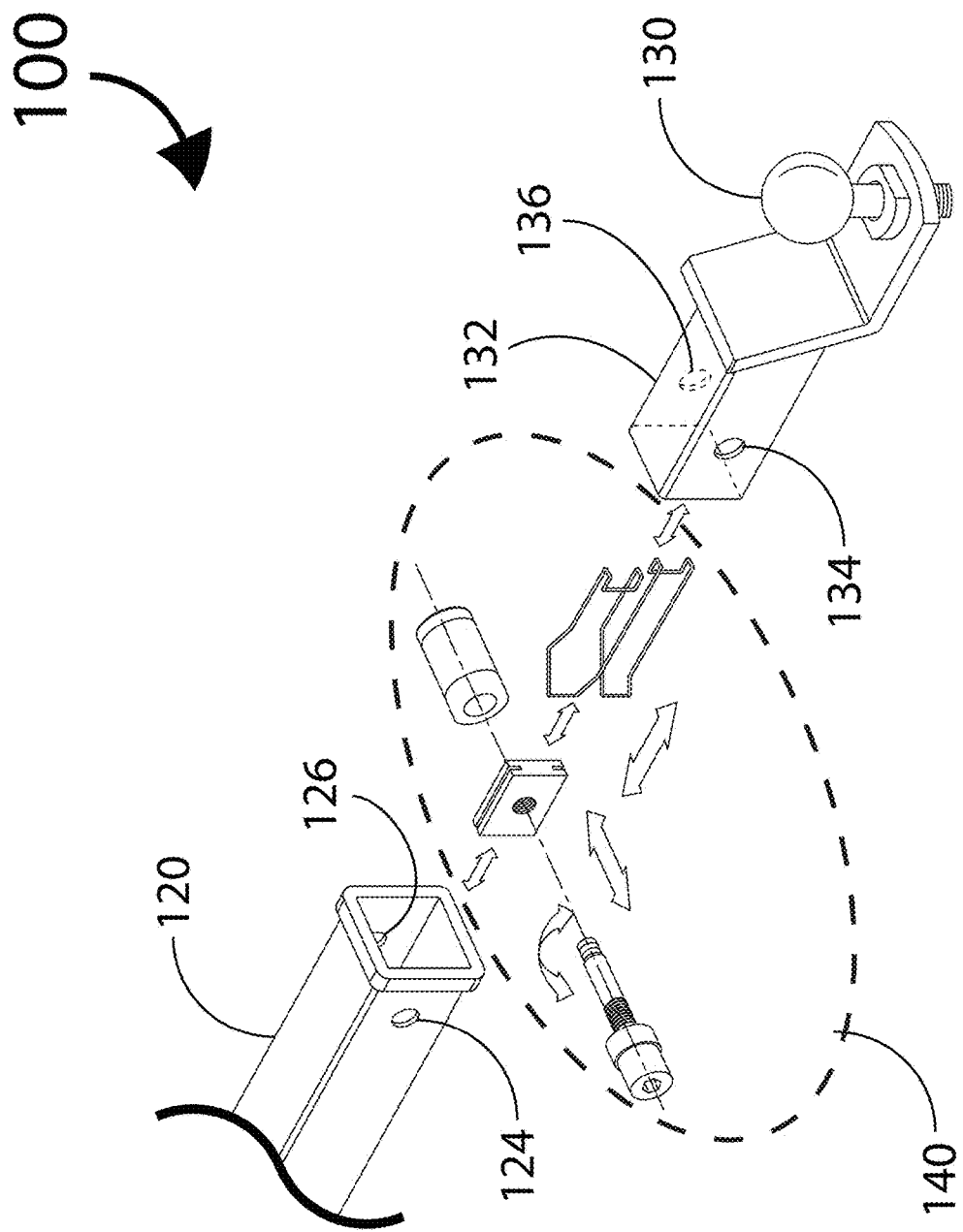

To facilitate discussion, FIGS. 1A and 1B are a cutaway perspective view and an exploded perspective view, respectively, illustrating one embodiment of a rattle-reducing assembly 140 for a vehicular hitch receiver assembly 100 in accordance with the present invention.

As shown in the cutaway view of FIG. 1A, the hitch pin assembly 140 fits into a receiver tube 120 of the trailer hitch receiver assembly 100 that is secured to a vehicle (not shown). The opposite end of the trailer hitch receiver assembly 100 includes a shank member 132 attached to a ball mount assembly 130. Accordingly, the hitch pin assembly 140 is configured to fit in between the receiver tube 120 and the shank member 132 as discussed below.

Figure 3:
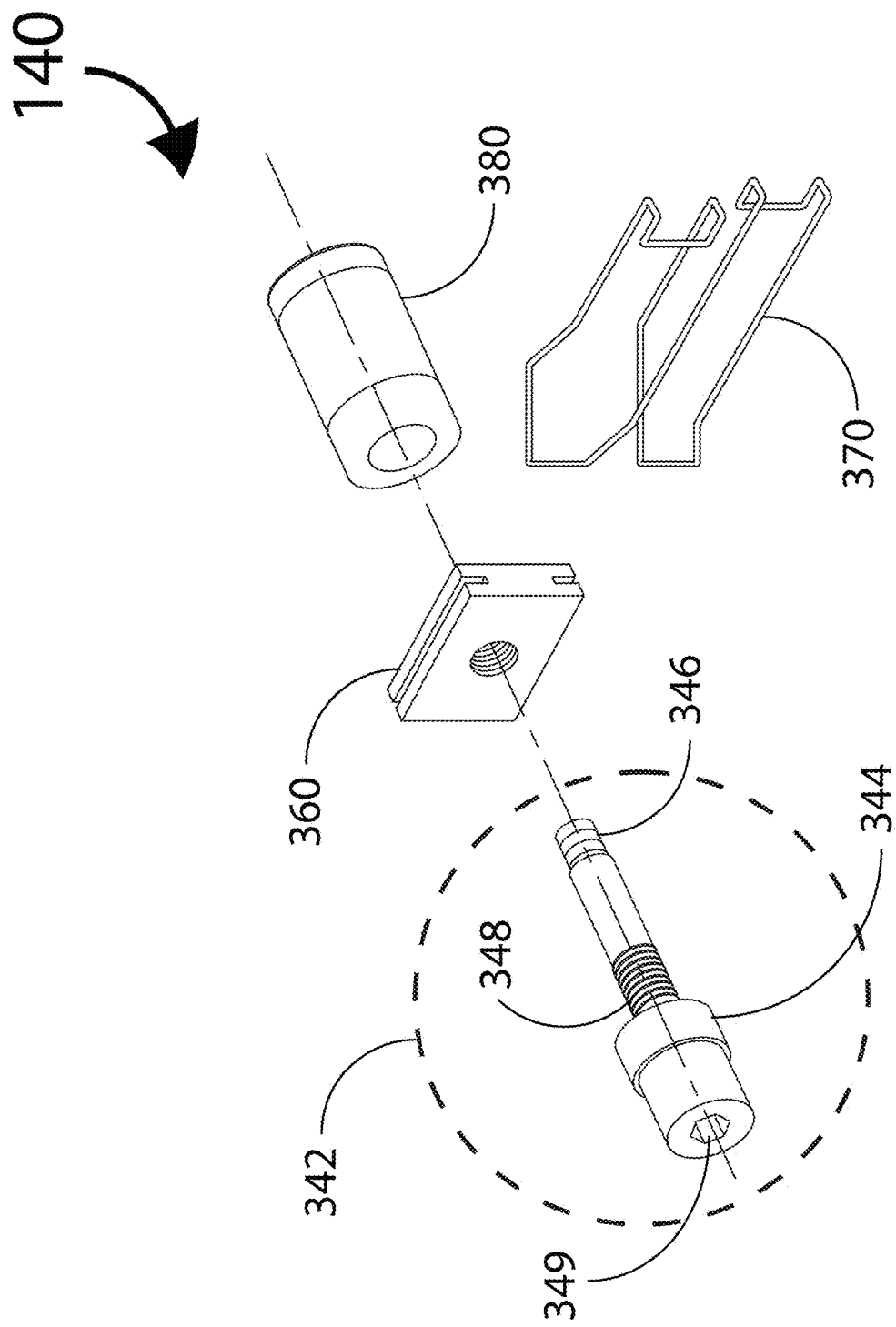
FIG. 3 is an exploded view of a hitch pin assembly for the anti-rattle vehicular trailer hitch assembly of FIG. 1A.

FIGS. 1B and 2 depict an exploded assembly view and a cross-sectional view, respectively, of the vehicular hitch receiver assembly 100, while FIG. 3 depicts an exploded view of hitch pin assembly 140. The hitch pin assembly 140 comprises of a long pin 342, a moveable slider assembly block 360, an arc-shaped retaining wire 370, and an optional lock 380.

Figure 4A:
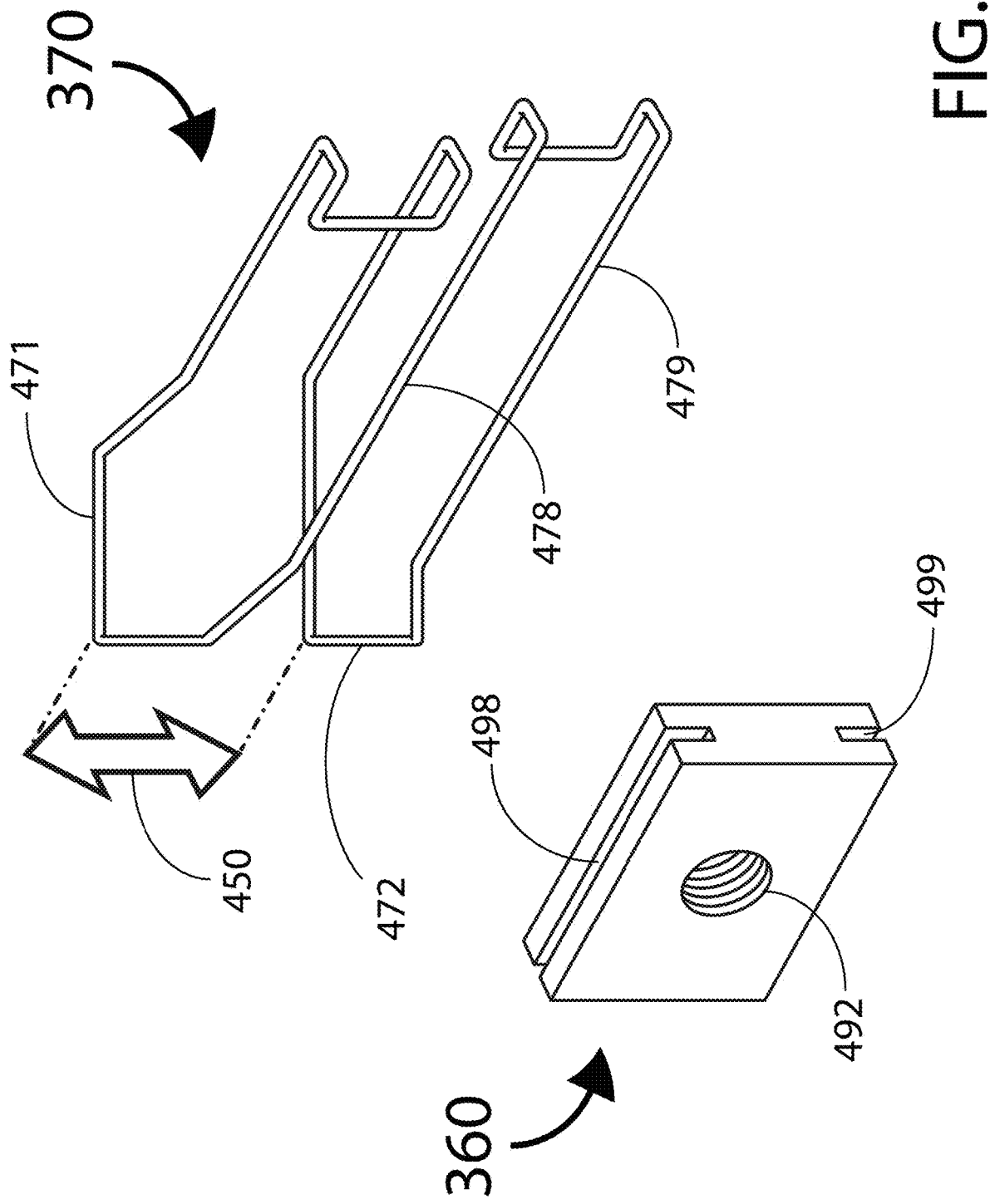
FIGS. 4A & 4B illustrates the interplay between a slider block and a retaining wire for the hitch pin assembly of FIG. 3.
Figure 4B:
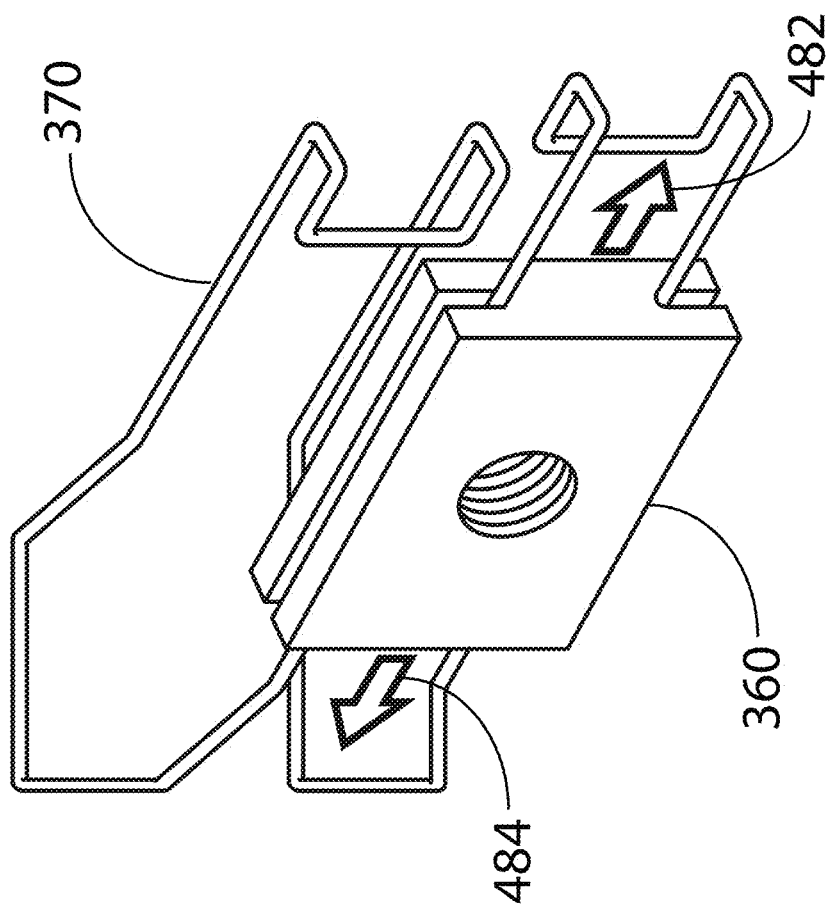

Referring also to FIGS. 4A-4B, perspective views illustrating the inter-operability of the moveable slider assembly block 360 and the arc-shaped retaining wire 370, the moveable slide block 360 has channels or cavities 498 & 499 on a pair of opposing sides. The retaining wire 370 includes a corresponding pair of track sections 478 & 479 that are placed into the respective channels 498 & 499, enabling track sections 478 & 479 to slide laterally in opposing directions 482 & 484 within channels 498 & 499, respectively. Track sections 478 & 479 also secure the moveable slide block 360 by compressing the block 360 between them.

In this embodiment, as depicted by FIG. 4A, a pair of opposing arc-shaped bends 471 & 472 of retaining wire 370 provides a vertical outward retaining force 450 after the combined moveable slider assembly block 360 and retaining wire 370 have been inserted inside the shank member 132.

As shown in FIGS. 1A-1B and FIG. 2, the moveable slide block 360 and retaining wire 370 are inserted into the shank member 132. An internal threaded hole 492 of the movable slider block 360 aligns with opposing holes 134 and 136 of the shank member 132. The shank member 132 is in turn configured to slide into the receiver tube 120 with opposing holes 134 and 136 of the shank member 132 aligning with opposing holes 124 and 126 of the receiver tube 120, respectively.

Referring back to FIG. 3, the long pin 342 has an external thread portion 348 adjacent to the housing head 344. On the opposite end of the housing head 344, is a locking groove 346. The long pin 342 is then inserted into the hole 124 of receiver tube 120, and into the corresponding hole 134 of shank member 132 until the external thread portion 348 engages the internal thread 492 of the movable slider block 360. The long pin 342 can now be rotated relative to the internal thread 492 to tighten the movable slider block 360 against the inner side wall of the shank member 132.

As the long pin 342 continues to be rotated relative to the movable slider block 360, the movable slider block 360 exerts pressure against the inner side wall of the shank member 132 which in turns clamps tightly against the inner side wall of the receiver tube 120. This rotational engagement between the threaded portion of the pin 342 and the movable slider block 360 with the retaining wire 370 would press against the inner side wall of the shank member 132 causing the shank member 132 to be clamped against the inner side wall of the receiver tube 120 in much the same manner as discussed above. As a result, the rattle of the shank member 132 and associated trailer or carrier mounts is minimized. Wear between the shank member 132 and the receiver tube 120 is also minimized as well.

Note that the shape of the moveable slider block 360 can be square, rectangular, or even-sided polygonal, i.e., non-circular, to ensure it cannot rotate within the shank member 132. It is understood that the internal thread 492 can be an internal through from a nut insert or an internal thread formed inside, e.g., tapped, the moveable slider block 360.

In this embodiment, the head housing 344 includes a hex socket 349 but could also be non-symmetrical shape unique to each long pin with a matching driver as shown and described below for tightening the exemplary long pin 342. This will provide additional theft and tampering proof mechanism, thereby supplementing the security provided by the lock 380 engaging a grooved end 346 of long pin 342.

As illustrated by the embodiment 500 of FIG. 5, an optional alterative configuration for the head housing 344 of the embodiment of FIG. 3 and its corresponding drive socket are shown. The drive socket 520 can be of a non-symmetrical shape and each drive socket is unique to each corresponding long pin, e.g., long pin 542 with its matching driver 520 for tightening the long pin 542 as shown in drive socket opening 522. This will provide additional theft and tampering proof mechanism. The head housing 544 can be equipped with a guard ring that can freely rotate in both directions 512 around the drive socket 520.

FIG. 6 a cross-sectional top view illustrating another embodiment of the anti-rattle vehicular trailer hitch assembly 600 with a pin retaining clip 690 configured to be inserted into and through long pin hole 680, i.e., clip 690 being a less costly but less secure substitute for lock 380.

Figure 10A:
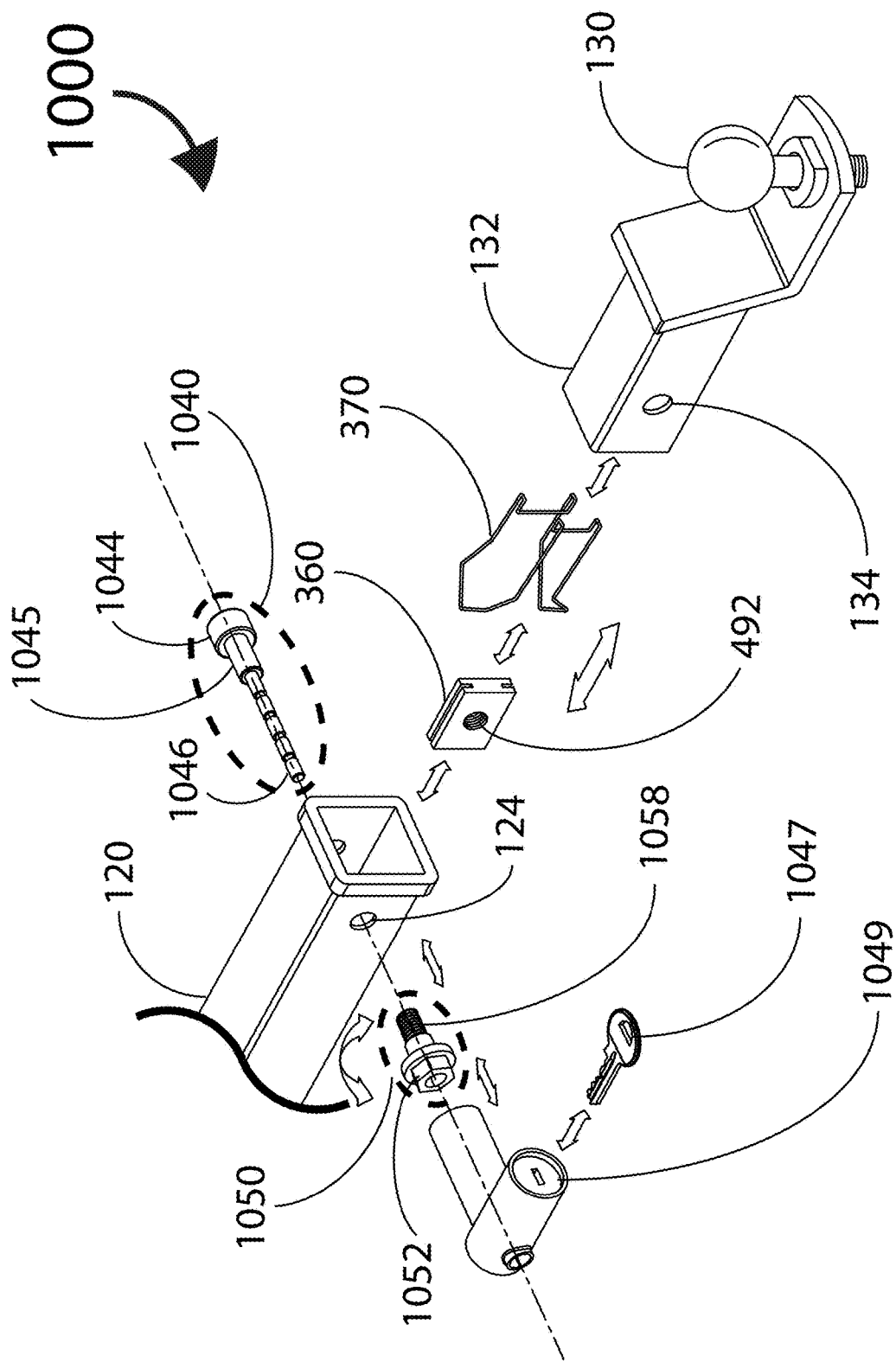
FIGS. 10A & 10B are perspective views illustrating another exemplary anti-rattle vehicular trailer hitch assembly, in accordance with another embodiment of the present invention.
Figure 10B:
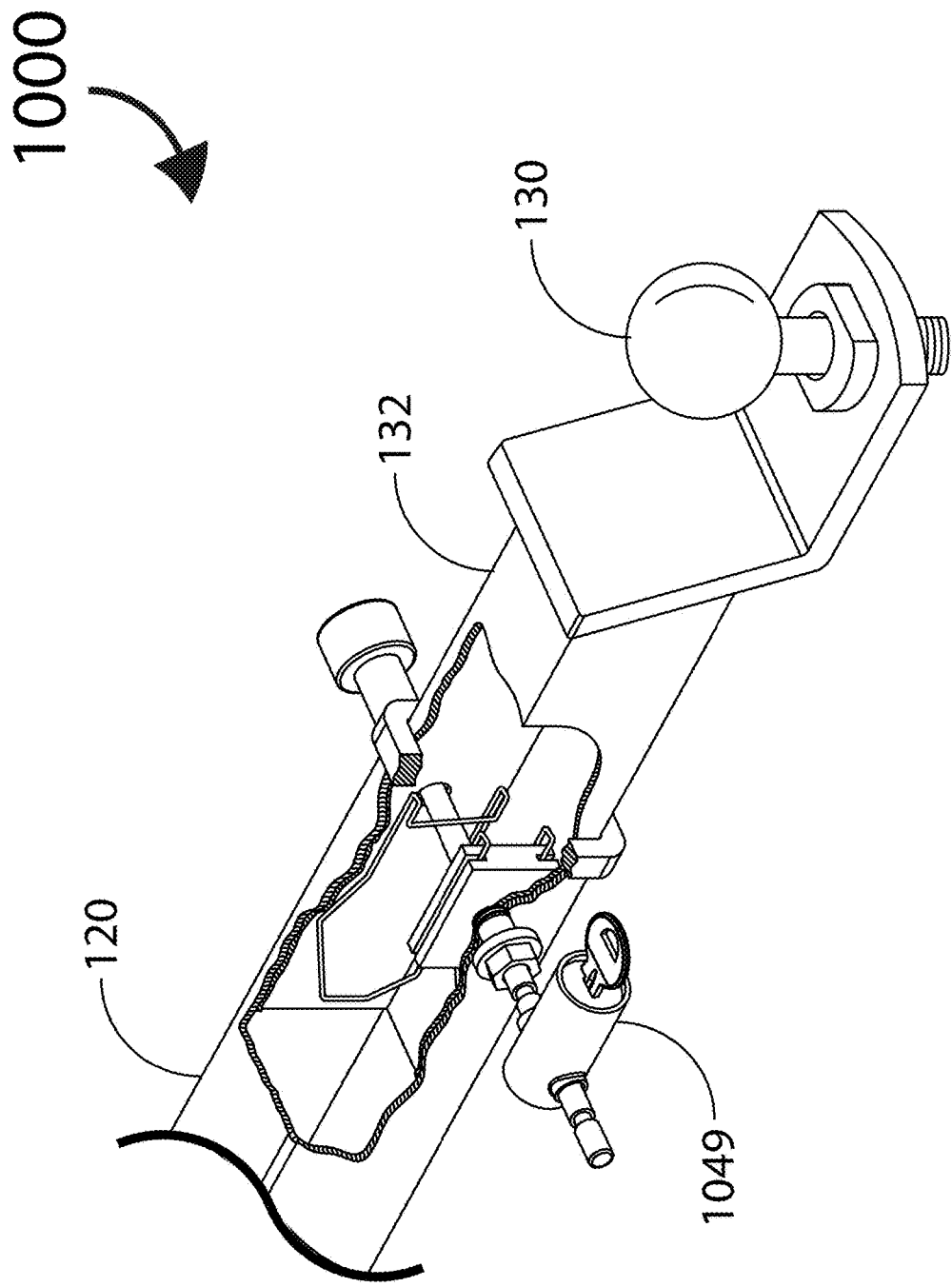

FIGS. 10A and 10B are perspective views of a vehicular hitch receiver assembly 1000 depicting assembly of another embodiment of a hitch pin assembly that fits into a receiver tube 120 that is secured to a vehicle (not shown). The opposite end of the trailer hitch receiver assembly 100 includes a shank member 132 attached to a ball mount assembly 130. Accordingly, the hitch pin assembly is configured to fit in between the receiver tube 120 and the shank member 132. This embodiment of hitch pin assembly comprises of a hollow bolt 1050, a tapered long pin 1040, a moveable slider assembly block 360, an arc-shaped retaining wire 370, and a hitch lock 1049 with a key 1047. Note that long pin 1040 tapers downwards in successively smaller diameters, starting from a drive head 1044, a receiver tube engagement section 1045 and a reduced-diameter grooved section 1046.

During assembly, the hollow bolt 1050 is inserted into the hole 124 of receiver tube 120, and into the corresponding hole 134 of shank member 132 until an external threaded portion 1058 engages the internal thread 492 of the movable slider block 360. The hollow bolt 1050 can now be rotated relative to the internal thread 492 to tighten the movable slider block 360 against the inner side wall of the shank member 132.

The reduced-diameter grooved section 1046 of the tapered long pin 1040 can now be inserted into and through an internal through hole of the hollow bolt 1050, with a pin end of grooved section 1046 protruding through the head 1052 of the hollow bolt 1050. The pin end of grooved section 1046 is ready to be engaged with the hitch lock 1049 and secured by key 1047, thereby preventing unauthorized removal of the long pin 1040 and shank member 132.

Figure 11:
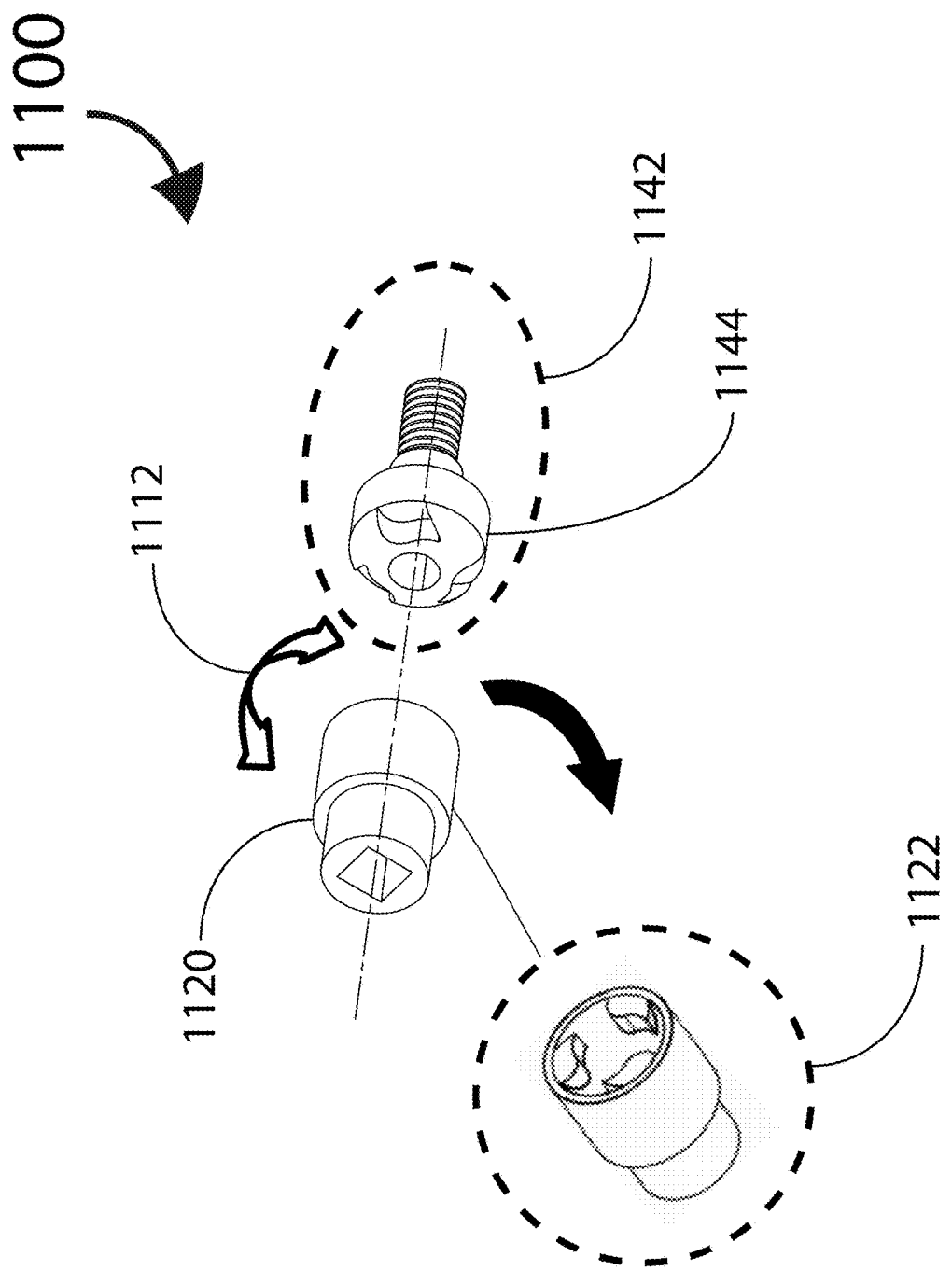
FIG. 11 depicts an additional exemplary embodiment with an alternate configuration for the hollow bolt housing of FIG. 10.

As illustrated by the hollow bolt embodiment 1100 of FIG. 11, an optional alterative configuration for a bolt head 1144 of a hollow bolt 1142 and its corresponding drive socket 1120 are shown, i.e., substituting for hollow bolt 1050 of FIG. 10. Hence, the drive socket 1120 can be of a non-symmetrical shape and each drive socket is unique to each corresponding hollow bolt, e.g., hollow bolt 1142 with its matching hex socket 1120 for tightening and loosening, around rotational direction 1112, the bolt 1142 as shown in socket opening 1122. This will provide additional theft and tampering proof mechanism.

Figure 12:
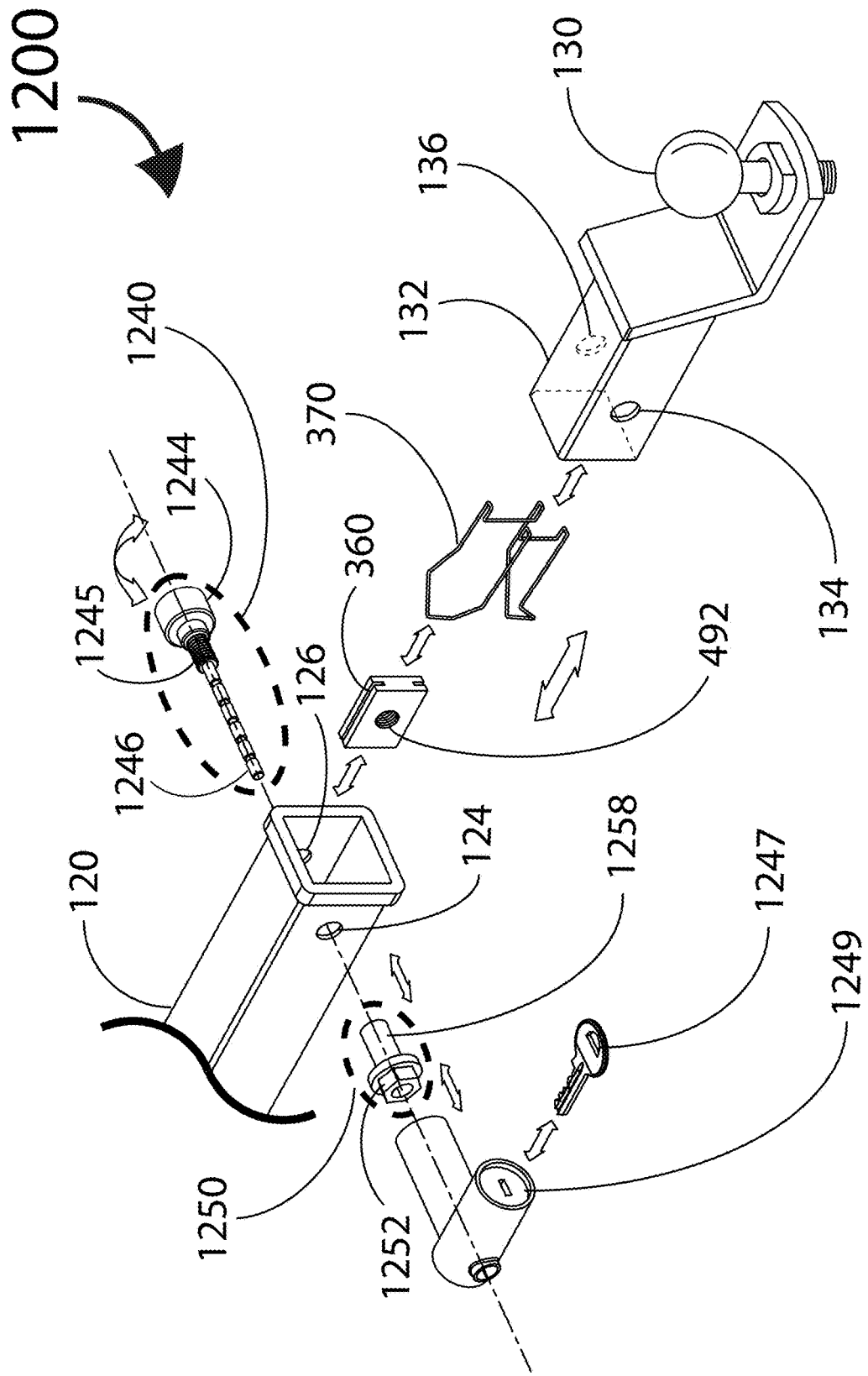
FIG. 12 is an exploded view illustrating another exemplary anti-rattle vehicular trailer hitch assembly, in accordance with another embodiment of the present invention.

FIG. 12 depicts an exploded assembly view of a vehicular hitch receiver assembly 1200 including another embodiment of a hitch pin assembly that fits into a receiver tube 120 that is secured to a vehicle (not shown). The opposite end of the trailer hitch receiver assembly 100 includes a shank member 132 attached to a ball mount assembly 130. Accordingly, the hitch pin assembly is configured to fit in between the receiver tube 120 and the shank member 132. This embodiment of hitch pin assembly comprises of a hollow bolt 1250, a long pin 1240, a moveable slider assembly block 360, an arc-shaped retaining wire 370, and a hitch lock 1249 with a key 1247.

During assembly, the hollow bolt 1250 is inserted into the hole 124 of receiver tube 120, and into the corresponding hole 134 of shank member 132. Next, tapered long pin 1240 is inserted into the hole 126 of receiver tube 120, and into the corresponding hole 136 of shank member 132 until an external thread portion 1245 engages the internal thread 492 of the movable slider block 360. The long pin 1240 includes a drive head 1244 configured to rotate the long pin 1240 relative to the internal thread 492 to tighten the movable slider block 360 against the inner side wall of the shank member 132.

Note that when the tapered long pin 1240 is inserted into the hole 126 and the corresponding hole 136 as described above, a reduced-diameter grooved section 1246 of the tapered long pin 1240 is simultaneously inserted into and through an internal through hole of a body 1258 of the hollow bolt 1250, with a pin end of grooved section 1246 protruding through the head 1252 of the hollow bolt 1250. Accordingly, the pin end of grooved section 1046 is ready to be engaged with the hitch lock 1249 and secured by key 1247.

Figure 13A:
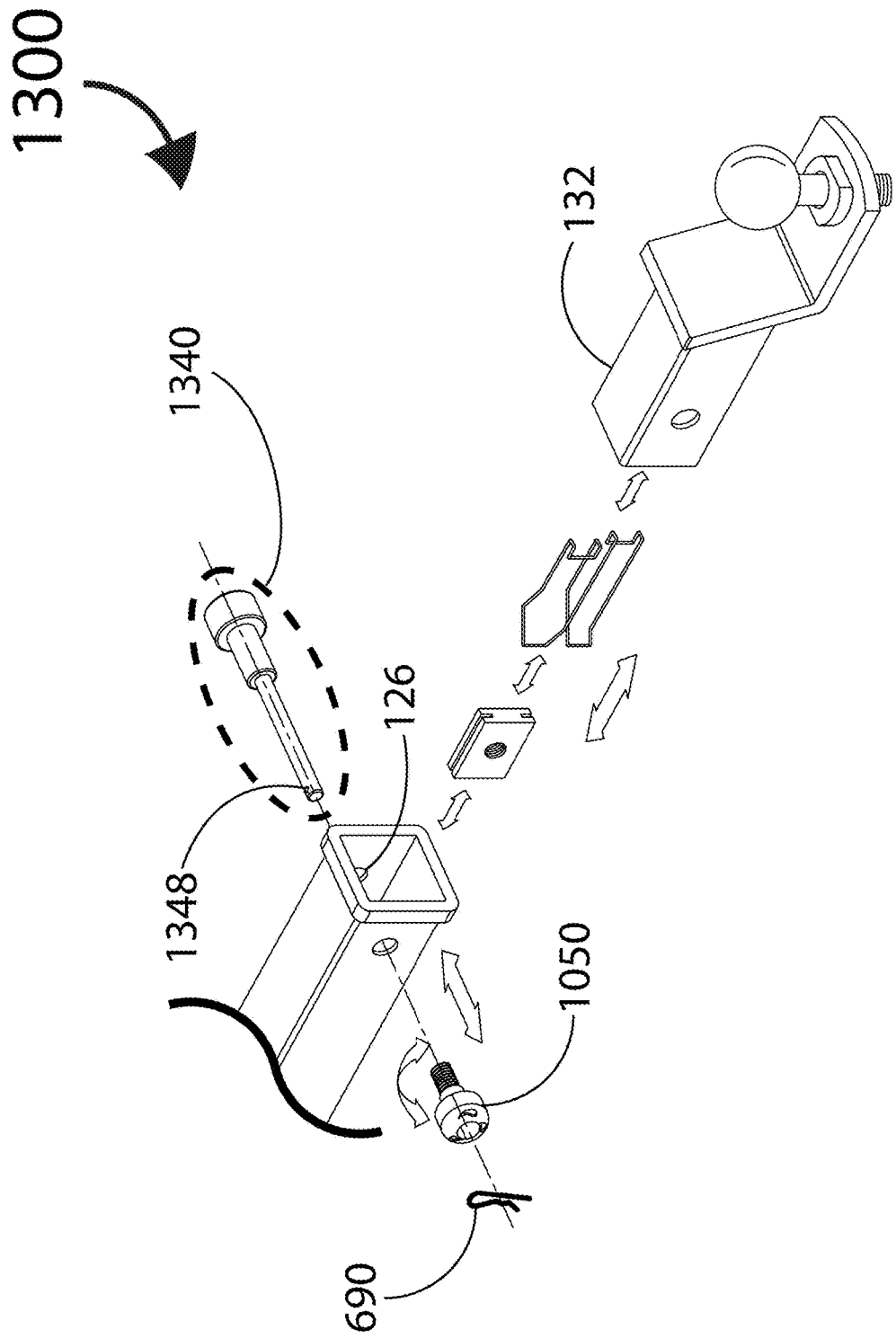
FIGS. 13A & 13B are perspective views illustrating yet another exemplary anti-rattle vehicular trailer hitch assembly, in accordance with another embodiment of the present invention.
Figure 13B:
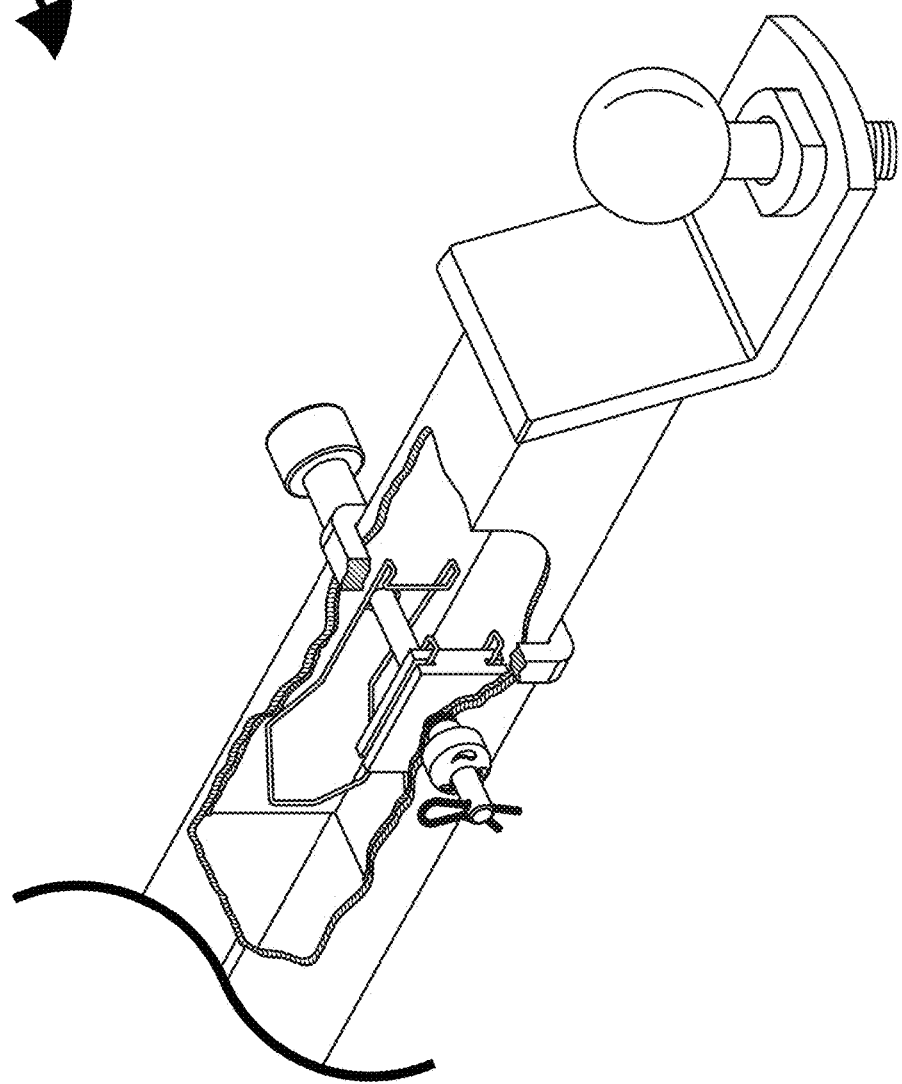

FIGS. 13A and 13B are perspective views illustrating yet another exemplary anti-rattle vehicular trailer hitch assembly 1300, which is similar to the trailer hitch assembly 1000 of FIG. 10. In this embodiment, in the absence of a hitch lock and key, a hitch pin retainer clip 690 is inserted into a pin hole 1348 of long pin 1340, after the long pin 1340 protrudes through hollow bolt 1050, to securely completing the assembly of the anti-rattle vehicular trailer hitch assembly 1300.

Figure 7A:
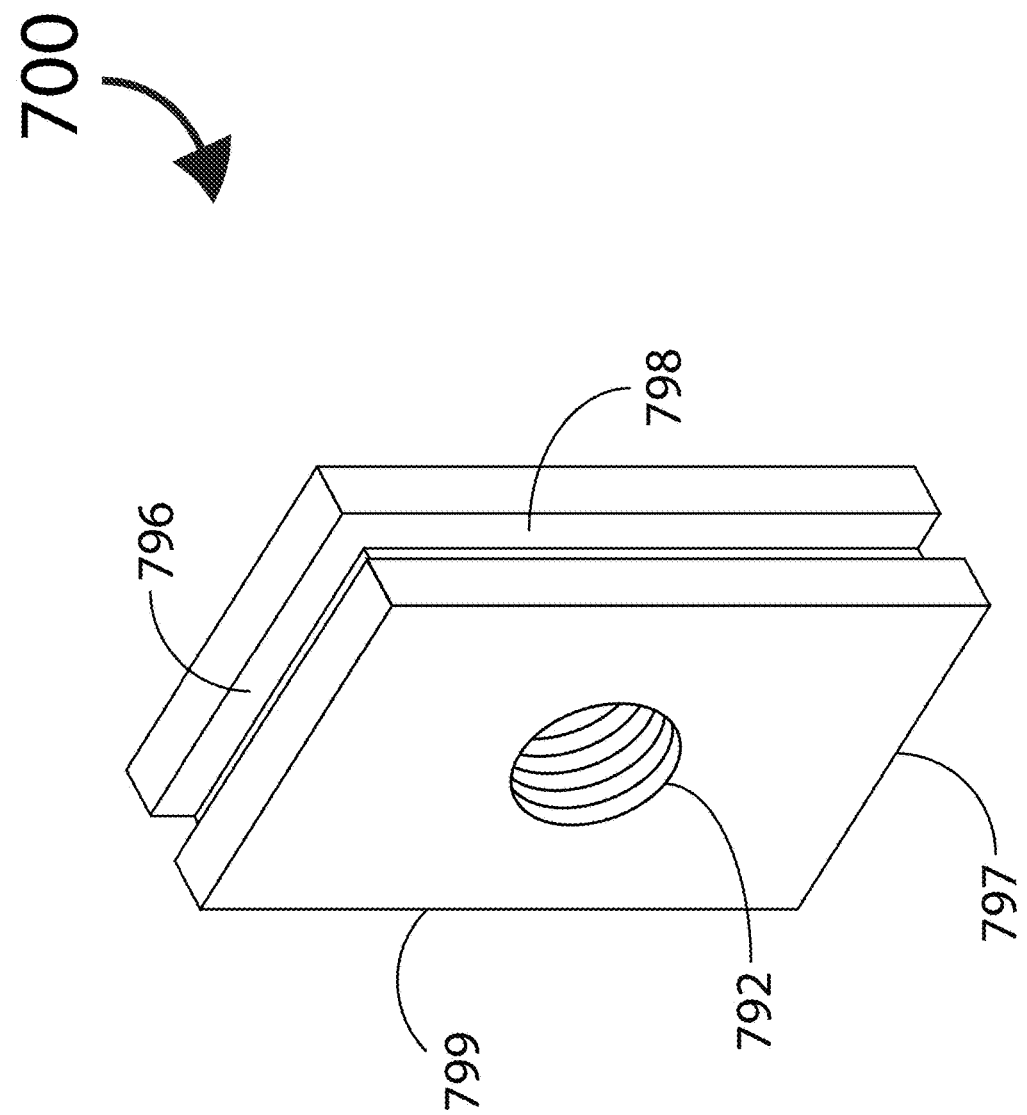
FIGS. 7A-7B are perspective views of an alternate embodiment of a slider block for the hitch pin assembly of FIG. 3.
Figure 7B:
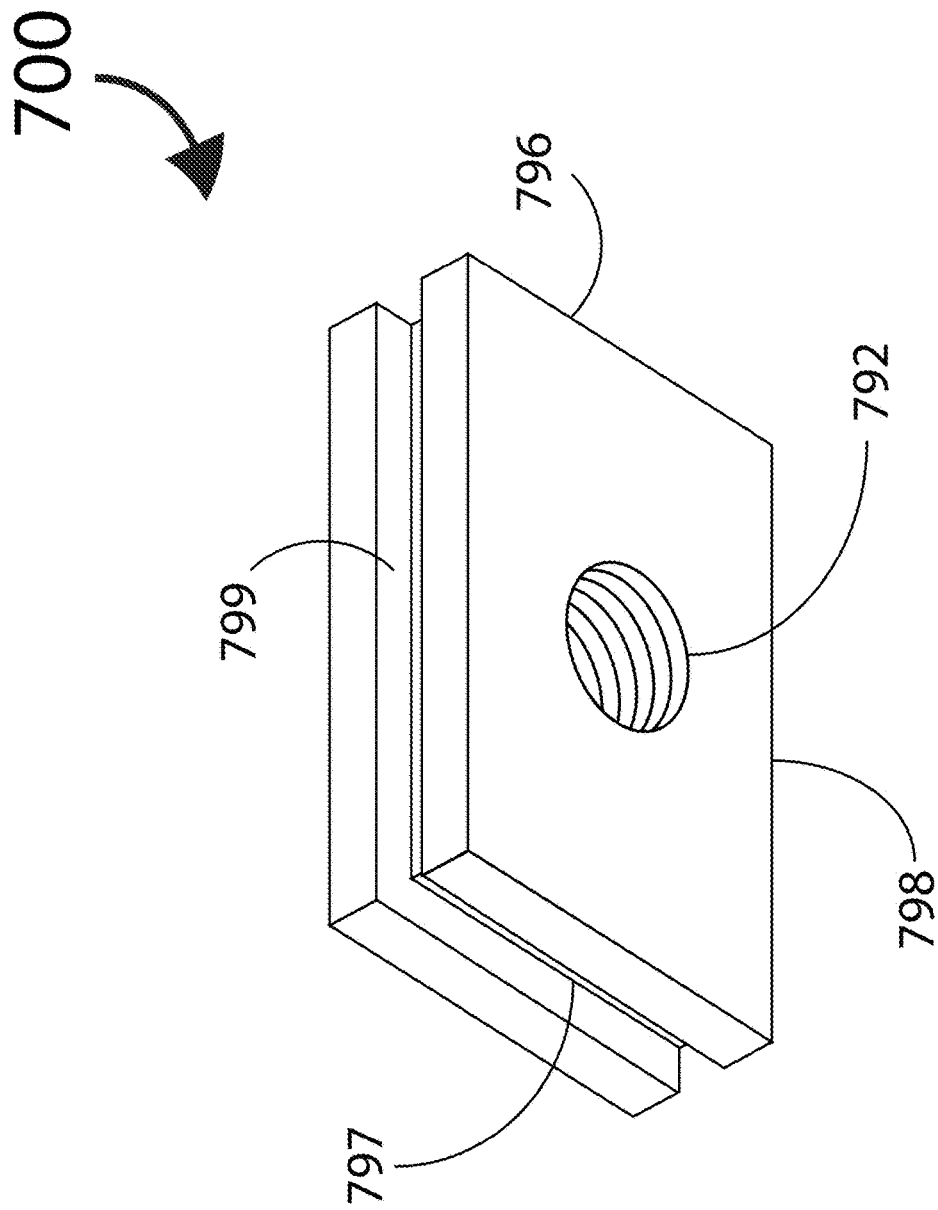

Many modifications and additions are contemplated within the spirit and scope of the present invention. For example, FIGS. 7A-7B show another embodiment of a moveable slider assembly block 700 with two pairs of opposing channels/cavities arranged 90 degrees relative to each other; a first pair of opposing channels/cavities 796 & 797 on a first pair of opposing sides, and a second pair of opposing channels/cavities 798 & 799 on a second pair of opposing sides. Such an arrangement will enable to the same moveable slider block 700 to be compatible with two differently-sized retaining wires configured to, e.g., a 2" receiver hitch and a 1.5" receiver hitch, by merely rotating the slider block 700 by 90 degrees. Slider block 700 also includes a threaded hole 792. In this example, FIG. 7A depicts a taller orientation for a larger 2" receiver hitch assembly while FIG. 7B depicts a shorter orientation for a smaller 1.5" receiver hitch assembly. It is also possible to combine various features of the above described assemblies, such as combining threaded hollow bolt 1050 and threaded long pin 1240, each paired with a corresponding sliding block 360.

Figure 8:
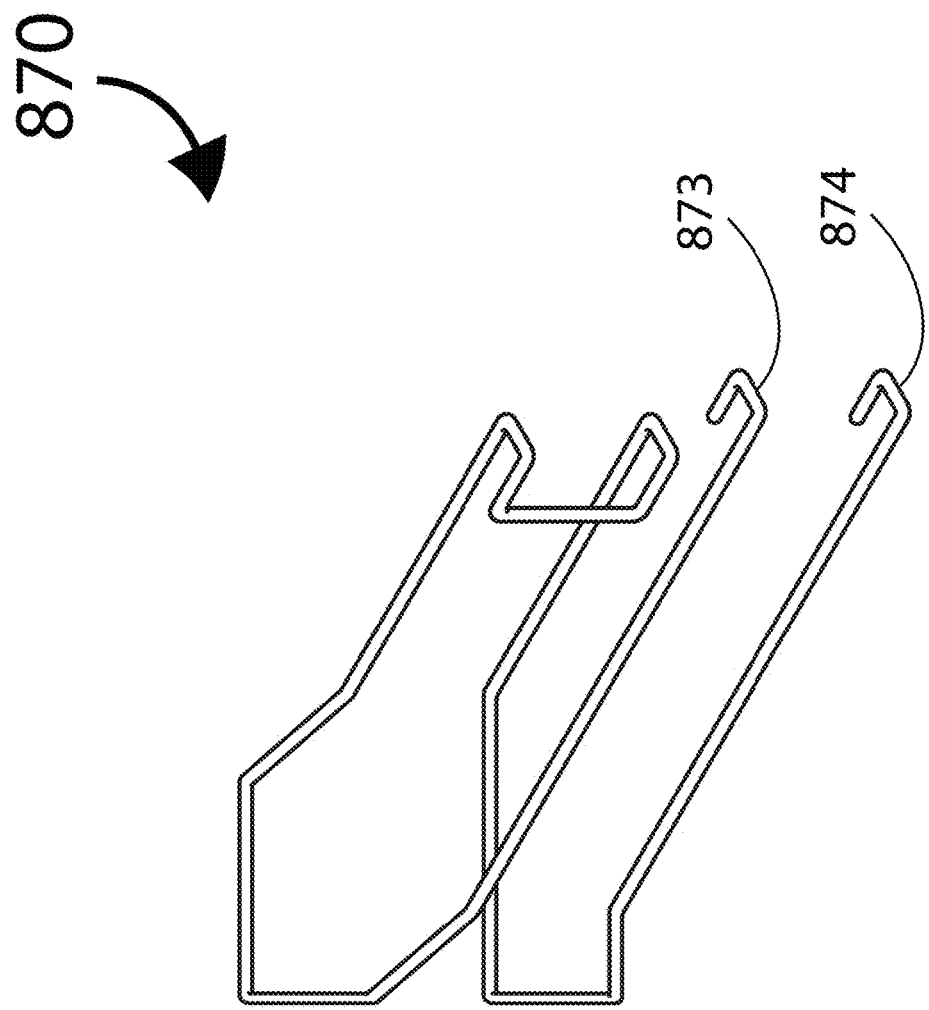

FIGS. 8 and 9 depict additional exemplary embodiments of retaining wires and slider blocks. In FIG. 8, a retaining wire 870 has a pair of hooked ends 873 & 874 instead of the continuous loop of the above described embodiment. In FIG. 9, a retaining wire 970 has a pair of truncated ends 973 & 974 instead of a continuous loop. The truncated ends 873 & 874 are configured to be inserted into a corresponding pair of blind holes 963 & 964 of a slider block 960. Note that it is also possible for another embodiment of a slider block (not shown) to have one or more through holes instead blind holes 963 & 964.

Advantages provided by the present invention include rattle reduction, minimization of wear and tear, and enhanced security as exemplified by the above described embodiments.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. In addition, where claim limitations have been identified, for example, by a numeral or letter, they are not intended to imply any specific sequence.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

I claim:

1. An anti-rattle hitch pin assembly useful with a trailer hitch system for reducing relative movement between a receiver tube and a shank member of the trailer hitch system, the anti-rattle hitch pin assembly comprising:
a cylindrical long pin with a drive head housing, a threaded section and a securable end;
an arc-shaped retainer configured to be secured inside the shank member by exerting an outward vertical force against a top internal wall and a bottom internal wall of the shank member;
a movable slider block having a pair of opposing channels for housing an upper track section and a lower track section of the retainer, wherein the pair of opposing channels are oriented perpendicularly relative to the long pin, wherein the slider block includes a threaded hole for mating with a threaded section of the long pin and wherein the slider block is configured to slide freely with respect to the arc-shaped retainer, and
wherein the long pin and the slider block are configured to securely compress a side wall of the receiver tube against an adjacent side wall of the shank member by engaging and tightening the threaded section of the long pin with the threaded hole of the slider block, thereby reducing rattle and wear between the receiver tube and the shank member.

2. The anti-rattle hitch pin assembly of claim 1 wherein the retainer is a wire and functions as a spring.

3. The anti-rattle hitch pin assembly of claim 1 wherein the drive head housing is a custom security drive head.

4. The anti-rattle hitch pin assembly of claim 1 further comprising a lock for securing the securable end of the long pin.

5. The anti-rattle hitch pin assembly of claim 1 further comprising a retainer clip for securing the securable end of the long pin.

6. The anti-rattle hitch pin assembly of claim 1 wherein the moveable slider block has a second pair of opposing channels for housing an upper track section and a lower track section of a differently-sized retainer, and wherein the pairs of opposing channels are oriented 90 degrees relative to each other.

7. The anti-rattle hitch pin assembly of claim 1 further comprising a guard ring that can freely rotate in both directions around the drive head housing.

8. An anti-rattle hitch pin assembly useful with a trailer hitch system for reducing relative movement between a receiver tube and a shank member of the trailer hitch system, the anti-rattle hitch pin assembly comprising:
a hollow bolt with a drive head housing and a threaded section;
a tapered cylindrical long pin with a drive head housing and a reduced-diameter securable end, and wherein the securable end is configured to be inserted into and through the hollow bolt and to protrude through the drive head housing of the hollow bolt;
an arc-shaped retainer configured to be secured inside the shank member by exerting an outward vertical force against a top internal wall and a bottom internal wall of the shank member;
a movable slider block having a pair of opposing channels for housing an upper track section and a lower track section of the retainer, wherein the pair of opposing channels are oriented perpendicularly relative to the long pin, wherein the slider block includes a threaded hole for mating with a threaded section of the hollow bolt, and wherein the slider block is configured to slide freely with respect to the arc-shaped retainer; and
wherein the hollow bolt and the slider block are configured to securely compress a side wall of the receiver tube against an adjacent side wall of the shank member by engaging and tightening the threaded section of the hollow bolt with the threaded hole of the slider block, thereby reducing rattle and wear between the receiver tube and the shank member.

9. The anti-rattle hitch pin assembly of claim 8 wherein the retainer is a wire and functions as a spring.

10. The anti-rattle hitch pin assembly of claim 8 wherein the drive head housing is a custom security drive head.

11. The anti-rattle hitch pin assembly of claim 8 further comprising a lock for securing the reduced-diameter securable end of the long pin.

12. The anti-rattle hitch pin assembly of claim 8 further comprising a retainer clip for securing the reduced-diameter securable end of the long pin.

13. The anti-rattle hitch pin assembly of claim 8 wherein the moveable slider block has a second pair of opposing channels for housing an upper track section and a lower track section of a differently-sized retainer, and wherein the pairs of opposing channels are oriented 90 degrees relative to each other.

* * * * *